United States Patent
Tsukada et al.

(10) Patent No.: US 8,255,662 B2
(45) Date of Patent: Aug. 28, 2012

(54) STORAGE MANAGEMENT APPARATUS AND STORAGE MANAGEMENT METHOD

(75) Inventors: Kouichi Tsukada, Kawasaki (JP); Satoshi Yazawa, Kawasaki (JP); Shoji Oshima, Kawasaki (JP); Tatsuhiko Machida, Kawasaki (JP); Hirokazu Matsubayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/977,894

(22) Filed: Dec. 23, 2010

(65) Prior Publication Data

US 2011/0170392 A1    Jul. 14, 2011

(30) Foreign Application Priority Data

Jan. 8, 2010 (JP) ................................ 2010-003330

(51) Int. Cl.
*G06F 12/00* (2006.01)
(52) U.S. Cl. .................... 711/172; 711/156; 714/6.32
(58) Field of Classification Search ............... 711/172, 711/156; 714/6.32
See application file for complete search history.

(56) References Cited

U.S. PATENT DOCUMENTS

| 7,290,088 | B2 * | 10/2007 | Rawe ............................ 711/114 |
| 8,037,244 | B2 * | 10/2011 | Muto et al. .................... 711/114 |
| 8,078,664 | B2 * | 12/2011 | Radia et al. .................... 709/201 |
| 2010/0161897 | A1 * | 6/2010 | Lee et al. ....................... 711/112 |
| 2011/0289277 | A1 * | 11/2011 | Takada et al. ................. 711/136 |

FOREIGN PATENT DOCUMENTS

| JP | 08-063298 A | 3/1996 |
| JP | 09-288547 A | 11/1997 |

* cited by examiner

*Primary Examiner* — Stephen Elmore
(74) *Attorney, Agent, or Firm* — Fujitsu Patent Center

(57) ABSTRACT

A reference-capacity calculating unit calculates a reference capacity of each of storage devices storing therein data on the basis of an actual capacity of each storage device. A difference calculating unit calculates a difference value between the reference capacity calculated by the reference-capacity calculating unit and the actual capacity of each storage device. A maximum-value retrieving unit retrieves the maximum difference value out of the respective difference values of the storage devices calculated by the difference calculating unit. A defined-capacity determining unit determines a defined capacity, which is an actually-used capacity of each storage device, on the basis of a value obtained by subtracting the maximum difference value from the reference capacity calculated by the reference-capacity calculating unit.

12 Claims, 18 Drawing Sheets

FIG.4

| CATEGORY | NOMINAL CAPACITY |
|---|---|
| 1 | LOWER THAN 100 GB |
| 2 | 100 GB OR HIGHER BUT NOT EXCEEDING 1000 GB |
| 3 | 1000 GB OR HIGHER |

FIG.5

TABLE OF MARGIN OF EACH CATEGORY

| CATEGORY | | |
|---|---|---|
| 1 | 2 | 3 |
| 1 GB | 2 GB | 1 GB |

FIG.6

DISK CAPACITY CORRESPONDENCE TABLE

| NOMINAL CAPACITY | 73 G | 300 G | 500 G | 750 G | 1000 G | 2000 G |
|---|---|---|---|---|---|---|
| CAPACITY RANGE | 72 G TO 297 G | 298 G TO 497 G | 498 G TO 747 G | 748 G TO 998 G | 999 G TO 1998 G | 1999 G |
| DEFINED CAPACITY | 72 G (73 G-1 G) | 298 G (300 G-2 G) | 498 G (500 G-2 G) | 748 G (750 G-2 G) | 999 G (1000 G-1 G) | 1999 G (2000 G-1 G) |

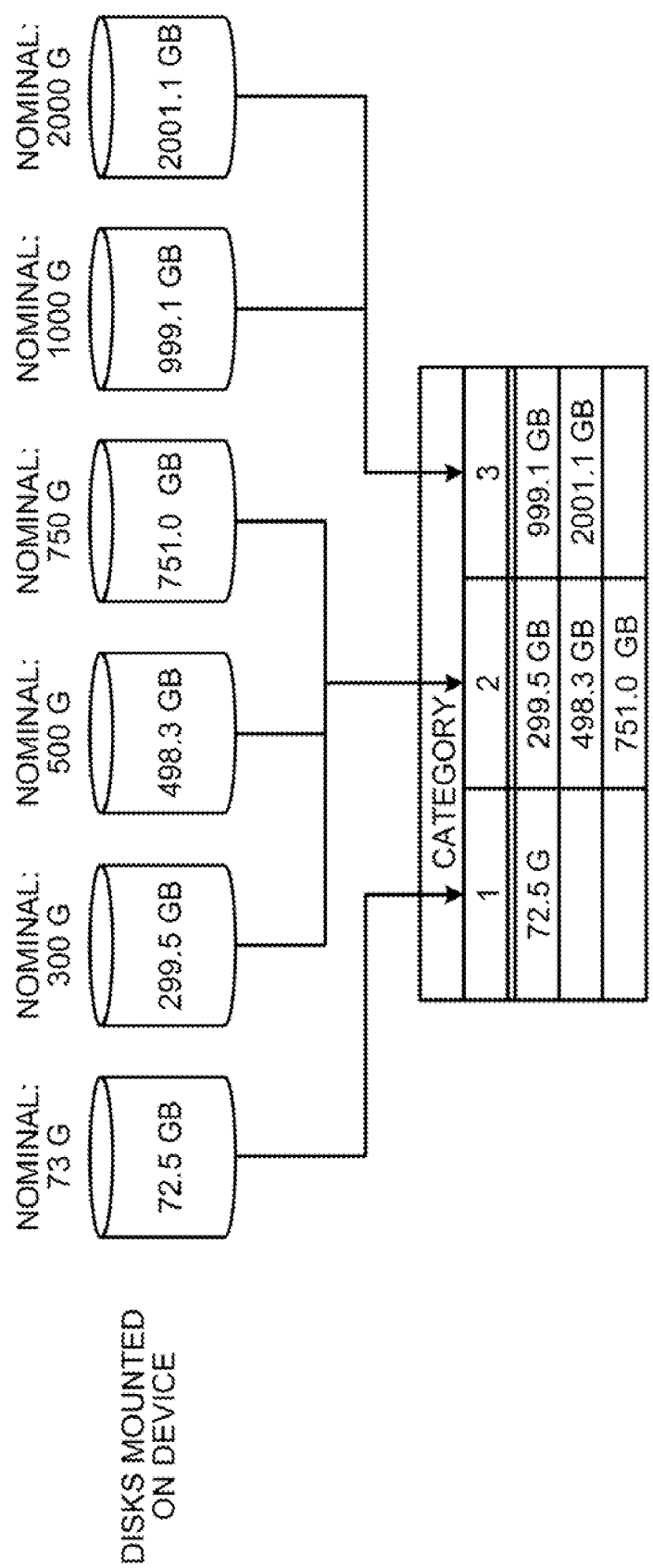

FIG.8

| CATEGORY | | |
|---|---|---|
| 1 | 2 | 3 |
| ACTUAL<br>CAPACITY   : 72.5 GB<br>NOMINAL    : 73 G<br>DIFFERENCE : 0.5 G | ACTUAL<br>CAPACITY   : 299.5 GB<br>NOMINAL    : 300 GB<br>DIFFERENCE : 0.5 GB | ACTUAL<br>CAPACITY   : 999.1 GB<br>NOMINAL    : 1000 GB<br>DIFFERENCE : 0.9 GB |
| | ACTUAL<br>CAPACITY   : 498.3 GB<br>NOMINAL    : 500 GB<br>DIFFERENCE : 1.7 GB | ACTUAL<br>CAPACITY   : 2001.1 GB<br>NOMINAL    : 2000 GB<br>DIFFERENCE : 0 GB |
| | ACTUAL<br>CAPACITY   : 751.0 GB<br>NOMINAL    : 750 GB<br>DIFFERENCE : 0 GB | |

FIG.9

| CATEGORY | | |
|---|---|---|
| 1 | 2 | 3 |
| ACTUAL<br>CAPACITY   : 72.5 GB<br>NOMINAL    : 73 G<br>DIFFERENCE : 0.5 G | ACTUAL<br>CAPACITY   : 299.5 GB<br>NOMINAL    : 300 GB<br>DIFFERENCE : 0.5 GB | ACTUAL<br>CAPACITY   : 999.1 GB<br>NOMINAL    : 1000 GB<br>DIFFERENCE : 0.9 GB |
| | ACTUAL<br>CAPACITY   : 498.3 GB<br>NOMINAL    : 500 GB<br>DIFFERENCE : 1.7 GB | ACTUAL<br>CAPACITY   : 2001.1 GB<br>NOMINAL    : 2000 GB<br>DIFFERENCE : 0 GB |
| | ACTUAL<br>CAPACITY   : 751.0 GB<br>NOMINAL    : 750 GB<br>DIFFERENCE : 0 GB | |

(SELECT THIS VALUE BECAUSE THERE IS ONLY ONE DIFFERENCE VALUE IN CATEGORY 1)

(SELECT MAXIMUM VALUE)

(SELECT MAXIMUM VALUE)

FIG.10

| CATEGORY | | |
|---|---|---|
| 1 | 2 | 3 |
| ACTUAL<br>CAPACITY : 72.5 GB<br>NOMINAL : 73 G<br>DIFFERENCE : 0.5 G | ACTUAL<br>CAPACITY : 299.5 GB<br>NOMINAL : 300 GB<br>DIFFERENCE : 0.5 GB | ACTUAL<br>CAPACITY : 999.1 GB<br>NOMINAL : 1000 GB<br>DIFFERENCE : 0.9 GB |
| | ACTUAL<br>CAPACITY : 498.3 GB<br>NOMINAL : 500 GB<br>DIFFERENCE : 1.7 GB | ACTUAL<br>CAPACITY : 2001.1 GB<br>NOMINAL : 2000 GB<br>DIFFERENCE : 0 GB |
| | ACTUAL<br>CAPACITY : 751.0 GB<br>NOMINAL : 750 GB<br>DIFFERENCE : 0 GB | |

MARGIN: 0.5 GB → 1 GB

MARGIN: 1.7 GB → 2 GB

MARGIN: 0.9 GB → 1 GB (1) NOMINAL: 400 GB (2) ACTUAL CAPACITY: 399 GB
NOMINAL: 400 GB
DIFFERENCE: 1 GB (3) TABLE OF MARGIN OF EACH CATEGORY

| CATEGORY | 1 | 2 | 3 |
|---|---|---|---|
| | 1 GB | 2 GB | 1 GB |

(4) DISK CAPACITY CORRESPONDENCE TABLE

| NOMINAL CAPACITY | 73 G | 300 G | 400 G | 500 G | 750 G | 1000 G | 2000 G |
|---|---|---|---|---|---|---|---|
| CAPACITY RANGE | 72 G TO 297 G | 298 G TO 397 G | 398 G TO 497 G | 498 G TO 747 G | 748 G TO 998 G | 999 G TO 1998 G | 1999 G |
| DEFINED CAPACITY | 72 G (73 G-1 G) | 298 G (300 G-2 G) | 398 G (400 G-2 G) | 498 G (500 G-2 G) | 748 G (750 G-2 G) | 999 G (1000 G-1 G) | 1999 G (2000 G-1 G) |

THIS CAPACITY RANGE IS ADDED

FIG.17
WHEN TYPES OF DISKS ARE
SORTED BY CAPACITY RANGE
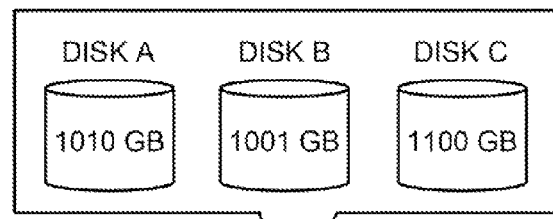
CAPACITY RANGES THAT DEVICE HAS
| CAPACITY RANGE | 100 TO 499 GB | 500 TO 999 GB | 1000 TO 1499 GB | 1500 GB OR HIGHER |
|---|---|---|---|---|
| DEFINED CAPACITY | 100 GB | 500 GB | 1000 GB | 1500 GB |
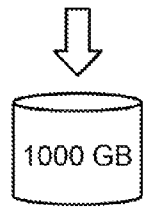
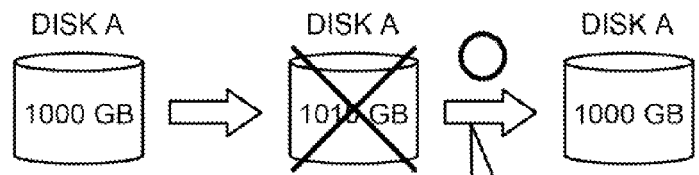
EVEN IF DISK DIFFERS IN ACTUAL
LBA FROM FAULTY DISK, DISKS
ARE TREATED AS DISK WITH SAME
CAPACITY, SO IT IS POSSIBLE TO
MAINTAIN

CAPACITY RANGES THAT DEVICE HAS

| CAPACITY RANGE | 100 TO 499 GB | 500 TO 999 GB | 1000 TO 1499 GB | 1500 GB OR HIGHER |
|---|---|---|---|---|
| DEFINED CAPACITY | 100 GB | 500 GB | 1000 GB | 1500 GB |

CAPACITIES OF ALL DISKS FALL WITHIN RANGE OF 1000
TO 1499 GB, SO DISKS ARE USED AS DISK WITH CAPACITY
OF 1000 GB IN DEVICE.

FIG.19
WHEN DEVICE PROGRAM
CANNOT RESPOND TO ADDITION
OF NEW CAPACITY RANGE
NOMINAL CAPACITY: 2000 GB
CAPACITY RANGES THAT DEVICE HAS
| CAPACITY RANGE | 100 TO 499 GB | 500 TO 999 GB | 1000 TO 1499 GB | 1500 TO GB |
|---|---|---|---|---|
| DEFINED CAPACITY | 100 GB | 500 GB | 1000 GB | 1500 GB |
EVEN WHEN DISK WITH CAPACITY IN
NEW CAPACITY RANGE IS MOUNTED, IF
DEVICE PROGRAM CANNOT BE REVISED,
DISK IS RECOGNIZED AS 1500 GB DISK

WHEN DEVICE PROGRAM CAN RESPOND TO ADDITION OF NEW CAPACITY RANGE

STORAGE MANAGEMENT APPARATUS AND STORAGE MANAGEMENT METHOD

CROSS-REFERENCE TO RELATED APPLICATION

This application is based upon and claims the benefit of priority of the prior Japanese Patent Application No. 2010-003330, filed on Jan. 8, 2010, the entire contents of which are incorporated herein by reference.

FIELD

The embodiments discussed herein are directed to a storage management apparatus and a storage management method.

BACKGROUND

Conventionally, a RAID (Redundant Arrays of Independent (Inexpensive) Disks) device is widely known as a technology for building a high-speed, high-capacity, highly-reliable disk system by combining a plurality of disks.

In such a RAID device, a plurality of disks, objects to be supported, may differ in actual capacity from one another, and therefore the other disks may not be able to be used as a maintenance part. For example, as illustrated in FIG. 16, a failure occurs in a disk A with an actual capacity of 1010 gigabytes (GB), and a disk B with an actual capacity of 1001 GB is used as a maintenance part of the disk A. In this case, the actual capacity of the disk B is lower than that of the disk A, so the disk B cannot be used as a maintenance part.

To cope with such a situation, a RAID device sets and stores a capacity range of disks to be supported in a FIRM, and supports only a disk meeting the capacity range. For example, as illustrated in FIG. 17, the RAID device stores a "capacity range" indicating a range of actual capacity of a disk and a "defined capacity" indicating a capacity defined for treating disks belonging to the capacity range as a disk with the same capacity in an associated manner.

For example, as illustrated in FIG. 17, when a disk A with an actual capacity of 1010 GB, a disk B with an actual capacity of 1001 GB, and a disk C with an actual capacity of 1100 GB are recognized by the RAID device, the disks A, B, and C belong to a capacity range of "1000 to 1499 GB". Since a defined capacity corresponding to the capacity range of "1000 to 1499 GB" is "1000 GB", in the RAID device, the disks A, B, and C are used as a disk with the same capacity of "1000 GB". Therefore, as illustrated in FIG. 18, when a failure occurs in the disk A with the actual capacity of 1010 GB, even if the disk B with the actual capacity of 1001 GB, which is a slightly different from that of the disk A, is used as a maintenance part of the disk A, the disk B can be used as a maintenance part because they are treated as a disk with the same capacity of 1000 GB.

When a disk vendor releases a disk with a capacity in a new capacity range, and the disk is added to the RAID device, there may be a large difference between an actual capacity and a defined capacity. For example, as illustrated in FIG. 19, the RAID device is programmed to treat a disk with an actual capacity in a capacity range of "1500 GB or higher" as a disk with a defined capacity of "1500 GB". In such a RAID device, if a disk of which the nominal capacity, which is given as a rough indication of classification of the disk, is 2000 GB and the actual capacity is 2050 GB in a new capacity range is added, the disk with the actual capacity of 2050 GB is recognized as a 1500 GB disk.

Consequently, there is known a technology of revising a device program for adding a new defined capacity when a disk with a capacity in a new capacity range is added. For example, as illustrated in FIG. 20, when a new capacity disk is added, a RAID device revises a device program thereby adding a defined capacity of 2000 GB or higher and a capacity range of 2000 GB or higher. Therefore, when a disk of which the nominal capacity is 2000 GB and the actual capacity is 2050 GB is added, the disk is recognized as a new disk with a defined capacity of 2000 GB.

However, in the above-described technology of revising the device program, it is not known which capacity range of a disk will be added in advance, so it is not possible to determine a capacity range in advance. Therefore, each time a new capacity disk is provided, the device program for adding a defined capacity corresponding to the new capacity disk is revised; thus, there is a problem that it is not possible to easily mount a new capacity disk.

Furthermore, if disks of which the nominal capacities are in the same nominal capacity range although respective actual capacities fall within different capacity ranges are mounted, the RAID device treats the disk in the higher capacity range as a disk with a one level lower capacity; thus, there is a problem that an inappropriate defined capacity is assigned to the disk.

For example, as illustrated in FIG. 21, even though a disk with an actual capacity of 1005 GB and a disk with an actual capacity of 999 GB are the same nominal capacity of 1000 GB, the RAID device recognizes the disks as disks with different defined capacities from each other. Therefore, there is a problem that a capacity that a user can use is reduced, and as a result, an inappropriate defined capacity is assigned to a disk.

Patent Document 1: Japanese Laid-open Patent Publication No. 09-288547

Patent Document 2: Japanese Laid-open Patent Publication No. 08-63298

SUMMARY

According to an aspect of an embodiment of the invention, a storage management apparatus includes a reference-capacity calculating unit that calculates a reference capacity, which is a reference data storage capacity, of each of storage devices storing therein data on the basis of an actual capacity of each of the storage devices; a difference calculating unit that calculates a difference value between the reference capacity calculated by the reference-capacity calculating unit and the actual capacity of each of the storage devices; a maximum-value retrieving unit that retrieves the maximum difference value out of the respective difference values of the storage devices calculated by the difference calculating unit; and a defined-capacity determining unit that determines a defined capacity, which is an actually-used capacity, of each of the storage devices on the basis of a value obtained by subtracting the maximum difference value from the reference capacity calculated by the reference-capacity calculating unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating an example of a nominal capacity category table;

FIG. 5 is a diagram illustrating an example of a category margin table;

FIG. 6 is a diagram illustrating an example of a disk capacity correspondence table;

FIG. 7 is a diagram illustrating a process of classifying disks into categories by nominal capacity;

FIG. 8 is a diagram illustrating a process of calculating a difference value between an actual capacity and a nominal capacity;

FIG. 9 is a diagram illustrating a process of retrieving the maximum value of difference values;

FIG. 10 is a diagram illustrating a process of rounding up a difference value to the whole number;

FIG. 17 is a diagram illustrating a case where types of disks are sorted by capacity range;

FIG. 19 is a diagram illustrating a case where a disk with a capacity in a new capacity range is added;

DESCRIPTION OF EMBODIMENTS

Preferred embodiments of the present invention will be explained with reference to accompanying drawings.

[a] First Embodiment

Figure 1:
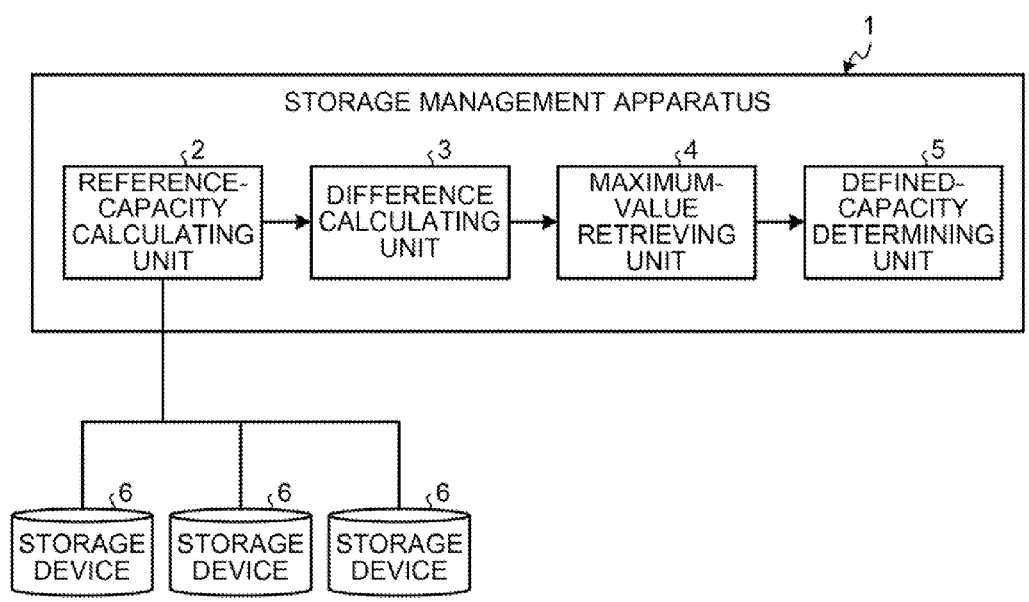
FIG. 1 is a block diagram illustrating a configuration of a storage management apparatus according to a first embodiment.

First, a configuration of a storage management apparatus according to a first embodiment is explained with reference to FIG. 1. FIG. 1 is a diagram illustrating the configuration of the storage management apparatus according to the first embodiment. As illustrated in FIG. 1, a storage management apparatus 1 according to the first embodiment includes a reference-capacity calculating unit 2, a difference calculating unit 3, a maximum-value retrieving unit 4, and a defined-capacity determining unit 5, and is connected to a plurality of storage devices 6.

The reference-capacity calculating unit 2 calculates a reference capacity of each of the storage devices 6 storing therein data on the basis of an actual capacity of each of the storage devices 6. The difference calculating unit 3 calculates a difference value between the reference capacity calculated by the reference-capacity calculating unit 2 and the actual capacity of each storage device 6.

The maximum-value retrieving unit 4 retrieves the maximum difference value out of the respective difference values of the storage devices 6 calculated by the difference calculating unit 3. The defined-capacity determining unit 5 determines a defined capacity, which is an actually-used capacity of each storage device 6, on the basis of a value obtained by subtracting the maximum difference value from the reference capacity calculated by the reference-capacity calculating unit 2.

The storage management apparatus 1 according to the first embodiment calculates a reference capacity of each storage device 6 on the basis of an actual capacity of the storage device 6, and determines a defined capacity on the basis of a value obtained by subtracting the maximum difference value, which is a margin value, from the reference capacity. Therefore, even when a new capacity disk is mounted, the storage management apparatus 1 according to the first embodiment can easily mount the new capacity disk without revising an apparatus program. Furthermore, the storage management apparatus 1 according to the first embodiment determines a defined capacity on the basis of a value obtained by subtracting a margin value from a reference capacity, and therefore even when an actual capacity is smaller than a nominal capacity, the storage management apparatus 1 can appropriately determine a usable defined capacity of a disk so as not to cross over the border of the capacity range.

[b] Second Embodiment

In a second embodiment described below, a configuration of a RAID device according to the second embodiment, a configuration of a CM, and a flow of a process performed by the CM are explained in this order, and the effects of the second embodiment are explained at the end.

Configuration of RAID Device

Figure 2:
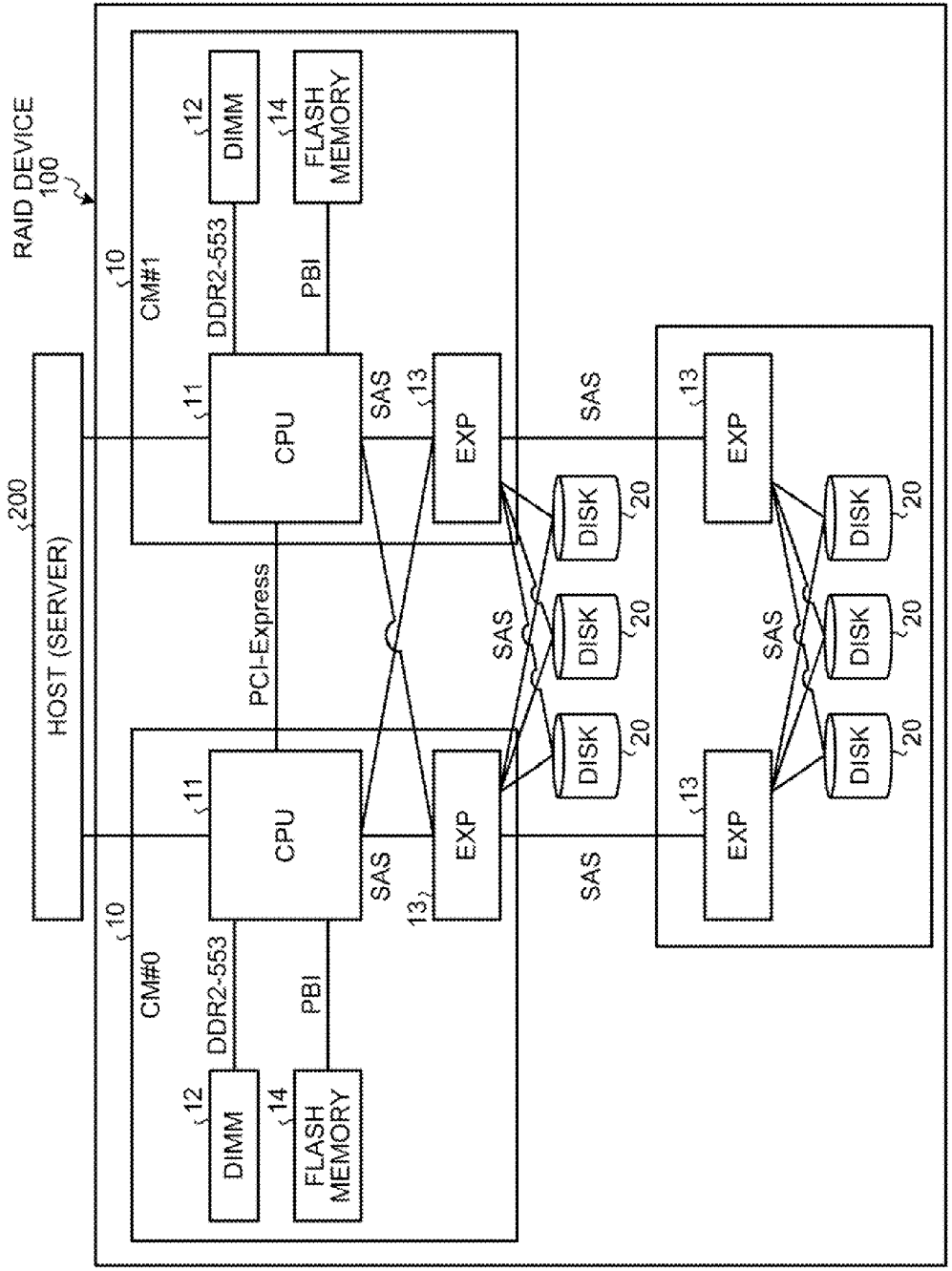
FIG. 2 is a block diagram illustrating an entire configuration of a RAID device according to a second embodiment.

Subsequently, a configuration of a RAID device 100 is explained with reference to FIG. 2. FIG. 2 is a block diagram illustrating an entire configuration of the RAID device according to the second embodiment. As illustrated in FIG. 2, the RAID device 100 includes a plurality of CMs (Controller Modules) 10 and a plurality of disks 20, and is connected to a host 200 which is a higher-level device. The RAID device 100 exchanges various user data or programs stored in the disks 20 with the host 200 in response to a request from the host 200 which is a higher-level device.

Each of the CMs 10 includes a CPU (Central Processing Unit) 11, a DIMM (Dual Inline Memory Module) 12, an EXP (expander) 13, and a flash memory 14. The CPU 11 is connected to a CPU of the other CM via an expansion function card compliant with the PCI-Express standard, and also connected to the DIMM 12 via a circuit, transmission line, or interface compliant with the DDR (Double Data Rate) 2-553 standard, or the like. Furthermore, the CPU 11 is connected to the flash memory 14 via an interface compliant with the PBI (Parallel Bus Interface), and also connected to the EXP 13 via an interface compliant with the SAS (Serial Attached SCSI).

The CPU 11 receives a request from the host 30, which is a higher-level device, and controls read/write processing with respect to the disks 20. The DIMM 12 stores therein data necessary for the CPU 11 to perform processing and, particularly, stores therein a disk capacity correspondence table (see FIG. 6) to be described in detail later.

The EXP 13 relays data exchanged between the CPU 11 and the disks 20. The flash memory 14 is a nonvolatile memory capable of protecting data held therein from being lost even if no power is fed thereto, and stores therein a disk management program for fulfilling a disk management function. The CPU 11 loads the program read out from the flash memory 14 into the DIMM 12 and executes the program, thereby initiating a process. A detailed configuration of the CM 10 and a process performed by the CM 10 will be described in detail below with reference to FIG. 3.

Configuration of CM

Figure 3:
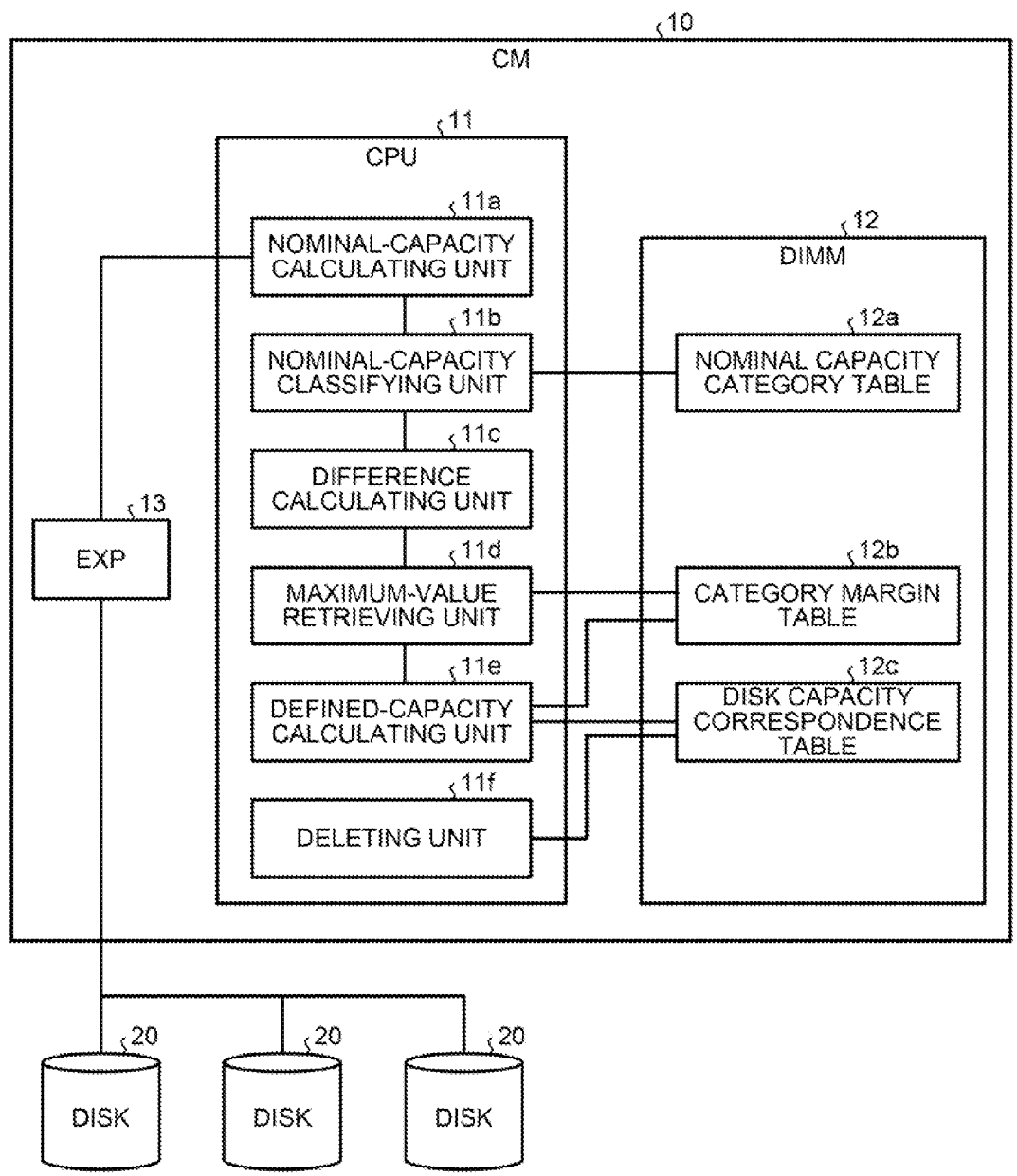
FIG. 3 is a block diagram illustrating a configuration of a CM according to the second embodiment.

Subsequently, a configuration of the CM 10 is explained with reference to FIG. 3. FIG. 3 is a block diagram illustrating the configuration of the CM according to the second embodiment. As illustrated in FIG. 2, the RAID device 100 includes the CM 10, the CPU 11, the DIMM 12, and the EXP 13, and is connected to the disks 20 via the EXP 13. Processes performed by these components are explained below.

The EXP 13 controls communications for information exchanged with the disks 20 connected. For example, the EXP 13 transmits a Read Capacity command to each of the disks 20, and receives a value of an actual capacity from each of the disks 20.

The DIMM 12 stores therein data necessary to various processes performed by the CPU 11, and includes a nominal capacity category table 12a, a category margin table 12b, and a disk capacity correspondence table 12c.

The nominal capacity category table 12a stores therein a predetermined range of nominal capacity in each category. Specifically, as illustrated in FIG. 4, the nominal capacity category table 12a stores therein ranges of nominal capacity in association with three categories "1" to "3". A nominal-capacity classifying unit 11b to be described later classifies the disks 20 into the categories with reference to the nominal capacity category table 12a (to be described in detail later with reference to FIG. 7). In an example of the nominal capacity category table 12a illustrated in FIG. 4, the table sets so as to classify the disks 20 in such a manner that the disk 20 of which the nominal capacity is "lower than 100 GB" is classified into category "1", the disk 20 of which the nominal capacity is "100 GB or higher but not exceeding 1000 GB" is classified into category "2", and the disk 20 of which the nominal capacity is "1000 GB or higher" is classified into category "3".

The category margin table 12b stores therein a margin value of each category. Specifically, as illustrated in FIG. 5, the category margin table 12b stores therein margin values in association with the three categories "1" to "3". In an example of the category margin table 12b illustrated in FIG. 5, a margin value of the category "1" is set to "1 GB", a margin value of the category "2" is set to "2 GB", and a margin value of the category "3" is set to "1 GB". A method of calculating the margin value will be described in detail later in the explanation of a difference calculating unit 11c and a maximum-value retrieving unit 11d to be described later.

The disk capacity correspondence table 12c stores therein a capacity range indicating a range of capacity and a defined capacity, which is a value calculated by subtracting a margin value from a nominal capacity, by each nominal capacity of the disks 20. Specifically, as illustrated in FIG. 6, the disk capacity correspondence table 12c stores therein a nominal capacity, a capacity range, and a defined capacity in an associated manner. In an example of the disk capacity correspondence table 12c illustrated in FIG. 6, the disk 20 of which the actual capacity is in a range of "72 GB to 297 GB" is set as the disk 20 with a nominal capacity of "73 GB", and a defined capacity of the disk 20 is set to "72 GB". A build process, an update process, and a delete process of the disk capacity correspondence table 12c will be described in detail later in the explanation of a defined-capacity calculating unit 11e and a deleting unit 11f to be described later.

The CPU 11 includes an internal memory for storing programs defining various processing procedures and necessary data, and executes various processes with these programs and data, and serves as a nominal-capacity calculating unit 11a, the nominal-capacity classifying unit 11b, the difference calculating unit 11c, the maximum-value retrieving unit 11d, the defined-capacity calculating unit 11e, and the deleting unit 11f.

The nominal-capacity calculating unit 11a calculates a nominal capacity of each of the disks 20. Specifically, the nominal-capacity calculating unit 11a issues a Read Capacity command to each of the disks 20, and receives an actual capacity of each of the disks 20. Then, the nominal-capacity calculating unit 11a determines whether the actual capacity received from each of the disks 20 is 100 GB or higher. As a result, if the actual capacity is lower than 100 GB, the nominal-capacity calculating unit 11a rounds a number of the actual capacity up to the whole number. For example, if the actual capacity is "72.5 GB", the nominal-capacity calculating unit 11a rounds a number of the actual capacity up to the whole number, and sets an obtained value "73 GB" as a nominal capacity.

If the actual capacity is "100 GB or higher", the nominal-capacity calculating unit 11a rounds a number of the actual capacity up to the nearest 10, and then rounds an obtained value to the nearest 50 or 100. For example, if the actual capacity is "299.5 GB", the nominal-capacity calculating unit 11a rounds a number of the actual capacity up to the nearest 10 and then rounds an obtained value to the nearest 50 or 100, and sets a finally-obtained value "300 GB" as a nominal capacity. If the actual capacity is "751 GB", the nominal-capacity calculating unit 11a rounds a number of the actual capacity up to the nearest 10 and obtains "760 GB", and then rounds the obtained value "760 GB" to the nearest 50 or 100 and obtains "750 GB", and sets the obtained value "750 GB" as a nominal capacity. After that, the nominal-capacity calculating unit 11a notifies the nominal-capacity classifying unit 11b of the nominal capacity of each of the disks 20.

The nominal-capacity classifying unit 11b classifies the disks 20 into categories by nominal capacity. Specifically, when receiving the nominal capacities of the disks 20 from the nominal-capacity calculating unit 11a, the nominal-capacity classifying unit 11b classifies the disks 20 into categories with reference to the nominal capacity category table 12a. For example, with reference to the nominal capacity category table 12a, the nominal-capacity classifying unit 11b classifies the disk 20 of which the nominal capacity is "lower than 100 GB" into the category "1", the disk 20 of which the nominal capacity is "100 GB or higher but not exceeding 1000 GB" into the category "2", and the disk 20 of which the nominal capacity is "1000 GB or higher" into the category "3".

A process of classifying the disks 20 by nominal capacity is explained here with an example illustrated in FIG. 7. FIG. 7 is a diagram illustrating the process of classifying the disks 20 into categories by nominal capacity. As illustrated in FIG. 7, the nominal-capacity classifying unit 11b classifies the disk 20 of which the nominal capacity is "73 GB" into the category "1" because the nominal capacity is "lower than 100 GB". Furthermore, the nominal-capacity classifying unit 11b classifies the disks 20 of which the nominal capacities are "300 GB", "500 GB", and "750 GB" into the category "2" because the nominal capacities are "100 GB or higher but not exceeding 1000 GB".

Moreover, the nominal-capacity classifying unit 11b classifies the disks 20 of which the nominal capacities are "1000 GB" and "2000 GB" into the category "3" because the nominal capacities are "1000 GB or higher". After that, the nominal-capacity classifying unit 11b notifies the difference calculating unit 11c of a result of the classification.

The difference calculating unit 11c calculates a difference value by subtracting the nominal capacity from the actual capacity of each disk 20 in each category. Specifically, when receiving the result of the classification from the nominal-capacity classifying unit 11b, the difference calculating unit 11c calculates a difference value by subtracting the nominal capacity from the actual capacity of each disk 20 in each category.

A process of calculating a difference value between the actual capacity and the nominal capacity is explained here with an example illustrated in FIG. 8. FIG. 8 is a diagram illustrating the process of calculating a difference value between the actual capacity and the nominal capacity. For example, as illustrated in FIG. 8, in the category 1, the difference calculating unit 11c obtains a difference "0.5 GB" calculated by subtracting an actual capacity "72.5 GB" from the nominal capacity "73 GB". Furthermore, in the category 1, the difference calculating unit 11c obtains a difference "1.7 GB" calculated by subtracting an actual capacity "498.3 GB" from the nominal capacity "500 GB". If the actual capacity is larger than the nominal capacity, a difference is counted as "0". After that, the difference calculating unit 11c notifies the maximum-value retrieving unit 11d of the calculated difference values.

The maximum-value retrieving unit 11d retrieves the maximum difference value in each category. Specifically, when receiving the difference values from the difference calculating unit 11c, the maximum-value retrieving unit 11d retrieves the maximum difference value in each category. A process of retrieving the maximum value of difference values is explained here with an example illustrated in FIG. 9. FIG. 9 is a diagram illustrating the process of retrieving the maximum value of difference values. As illustrated in FIG. 9, in the category "1", there is only one difference value "0.5 GB", so the maximum-value retrieving unit 11d selects the difference value "0.5 GB".

Furthermore, in the category "2", the maximum-value retrieving unit 11d compares the difference values "0.5 GB", "1.7 GB", and "0 GB", and selects the maximum difference value "1.7 GB". Moreover, in the category "3", the maximum-value retrieving unit 11d compares the difference values "0.9 GB" and "0 GB", and selects the maximum difference value "0.9 GB".

Subsequently, the maximum-value retrieving unit 11d rounds a number of the maximum difference value up to the whole number, and stores an obtained value in the category margin table 12b as a margin value of each category. For example, as illustrated in FIG. 10, the maximum difference value "0.5 GB" of the category "1" is rounded to "1 GB", the maximum difference value "1.7 GB" of the category "2" is rounded to "2 GB", and the maximum difference value "0.9 GB" of the category "3" is rounded to "1 GB", and obtained values "1 GB", "2 GB", and "1 GB" are stored in the category margin table 12b as respective margin values of the categories 1 to 3. FIG. 10 is a diagram illustrating a process of rounding a difference value up to the whole number.

The defined-capacity calculating unit 11e calculates a disk defined capacity from the margin value of each category and the nominal capacity of each disk 20. Specifically, the defined-capacity calculating unit 11e defines a value obtained by subtracting the margin value corresponding to the category of each disk 20 from the nominal capacity of the disk 20 as a defined capacity of the disk 20. For example, to explain with an example illustrated in FIG. 10, the defined-capacity calculating unit 11e defines "72 GB", which is a value obtained by subtracting the margin value "1 GB" of the category of the disk 20 from the nominal capacity "73 GB" of the disk 20, as a defined capacity, and stores the defined capacity "72 GB" in the disk capacity correspondence table 12c.

Furthermore, to explain with the example illustrated in FIG. 10, the defined-capacity calculating unit 11e defines "298 GB", which is a value obtained by subtracting the margin value "2 GB" of the category of the disk 20 from the nominal capacity "300 GB" of the disk 20, as a defined capacity, and stores the defined capacity "298 GB" in the disk capacity correspondence table 12c.

Furthermore, the defined-capacity calculating unit 11e determines a capacity range corresponding to each disk 20 on the basis of the defined capacity, and stores the capacity range in the disk capacity correspondence table 12c. Even if the disks 20 in the same capacity range slightly differ in capacity, the RAID device 100 treats the disks 20 in the same capacity range as a disk with the same defined capacity. To explain with an example illustrated in FIG. 6, for example, when defined capacities of the disks 20 are respectively 72 GB, 298 GB, and 498 GB, the defined-capacity calculating unit 11e stores "72 GB to 297 GB", "298 GB to 497 GB", and "498 GB to 747 GB" in the disk capacity correspondence table 12c as respective capacity ranges of the disks 20.

Figure 11:
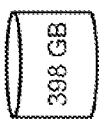
FIG. 11 is a diagram illustrating a process of adding a disk with a new nominal capacity.

A process of adding a new nominal-capacity disk is explained here with reference to FIG. 11. FIG. 11 is a diagram illustrating the process of adding a new nominal-capacity disk. When a disk with a new nominal capacity (in an example illustrated in FIG. 11, a disk with a nominal capacity of 400 GB) is added, the CM 10 calculates a difference between the nominal capacity and an actual capacity of the added disk. In the example illustrated in FIG. 11, the CM 10 obtains "1 GB" as a difference between the nominal capacity of 400 GB and an actual capacity of 399 GB.

Then, the CM 10 compares the obtained margin with the existing margin stored in the category margin table 12b, and determines whether the obtained margin is larger than the existing margin. As a result, if the obtained margin is smaller than the existing margin, the CM 10 calculates a defined capacity without updating the category margin table 12b, and adds the defined capacity and capacity range corresponding to the new nominal capacity into the disk capacity correspondence table 12c.

Figure 12:
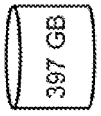
FIG. 12 is a diagram illustrating a process of changing a capacity category margin.

Subsequently, a process of changing the capacity category margin is explained with reference to FIG. 12. FIG. 12 is a diagram illustrating the process of changing the capacity category margin. As illustrated in FIG. 12, when a disk with the existing nominal capacity (in an example illustrated in FIG. 11, a disk with a nominal capacity of 400 GB) is newly mounted, the CM 10 calculates a difference between the nominal capacity and an actual capacity of the disk. In an example illustrated in FIG. 12, the CM 10 obtains "3 GB" as a difference between the nominal capacity of 400 GB and an actual capacity of 397 GB.

Then, the CM 10 compares the obtained margin with the existing margin stored in the category margin table 12b, and determines whether the obtained margin is larger than the existing margin. As a result, if the obtained margin is larger than the existing margin, the CM 10 updates the category margin table 12b. In the example illustrated in FIG. 12C, it is determined that the obtained margin "3 GB" is larger than the existing margin "2 GB", the CM 10 updates the margin of the category "2" to "3 GB".

As the margin value is updated, the CM 10 then updates the corresponding defined capacity and capacity range in the disk capacity correspondence table 12c on the basis of the updated margin value. Even when it is determined that the obtained margin is larger than the existing margin, if the margin is larger than a predetermined threshold value, the added disk is judged as a defective product, and the CM 10 does not have to update the margin value.

When the disk 20 is deleted, the deleting unit 11f deletes information corresponding to the deleted disk from the disk capacity correspondence table 12c. Specifically, when the disk 20 is deleted, the deleting unit 11f searches whether the disk 20 with the nominal capacity registered in the disk capacity correspondence table 12c is present in the RAID device 100.

As a result of the search, when it is determined that there is no disk 20 with the nominal capacity within the disk capacity correspondence table 12c in the RAID device 100, the deleting unit 11f deletes information on the disk with the nominal capacity, which is not present in the RAID device 100, from the disk capacity correspondence table 12c.

Process Performed by CM

Figure 13:
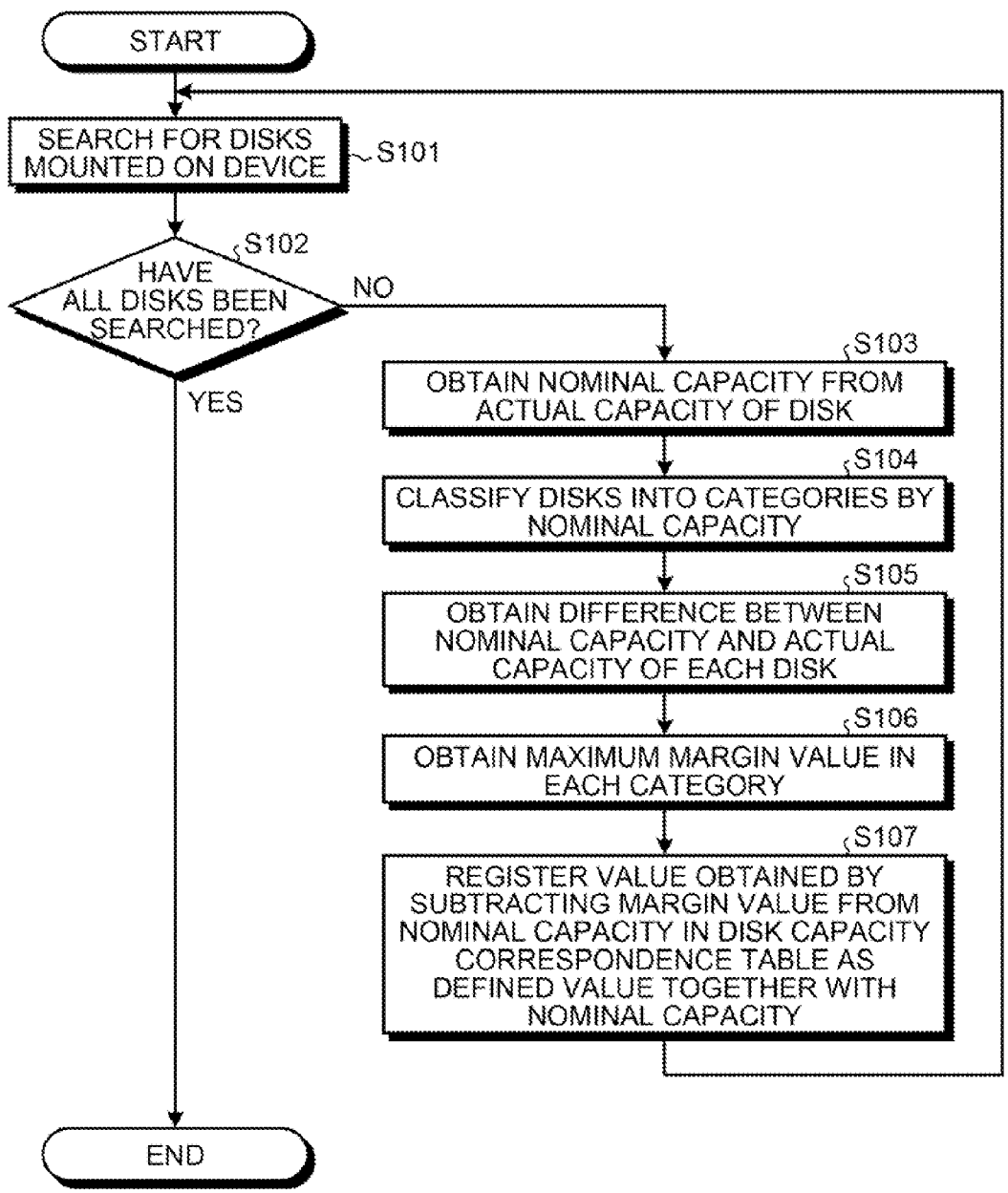
FIG. 13 is a flowchart illustrating procedures of a process of building the disk capacity correspondence table performed by the CM according to the second embodiment.
Figure 14:
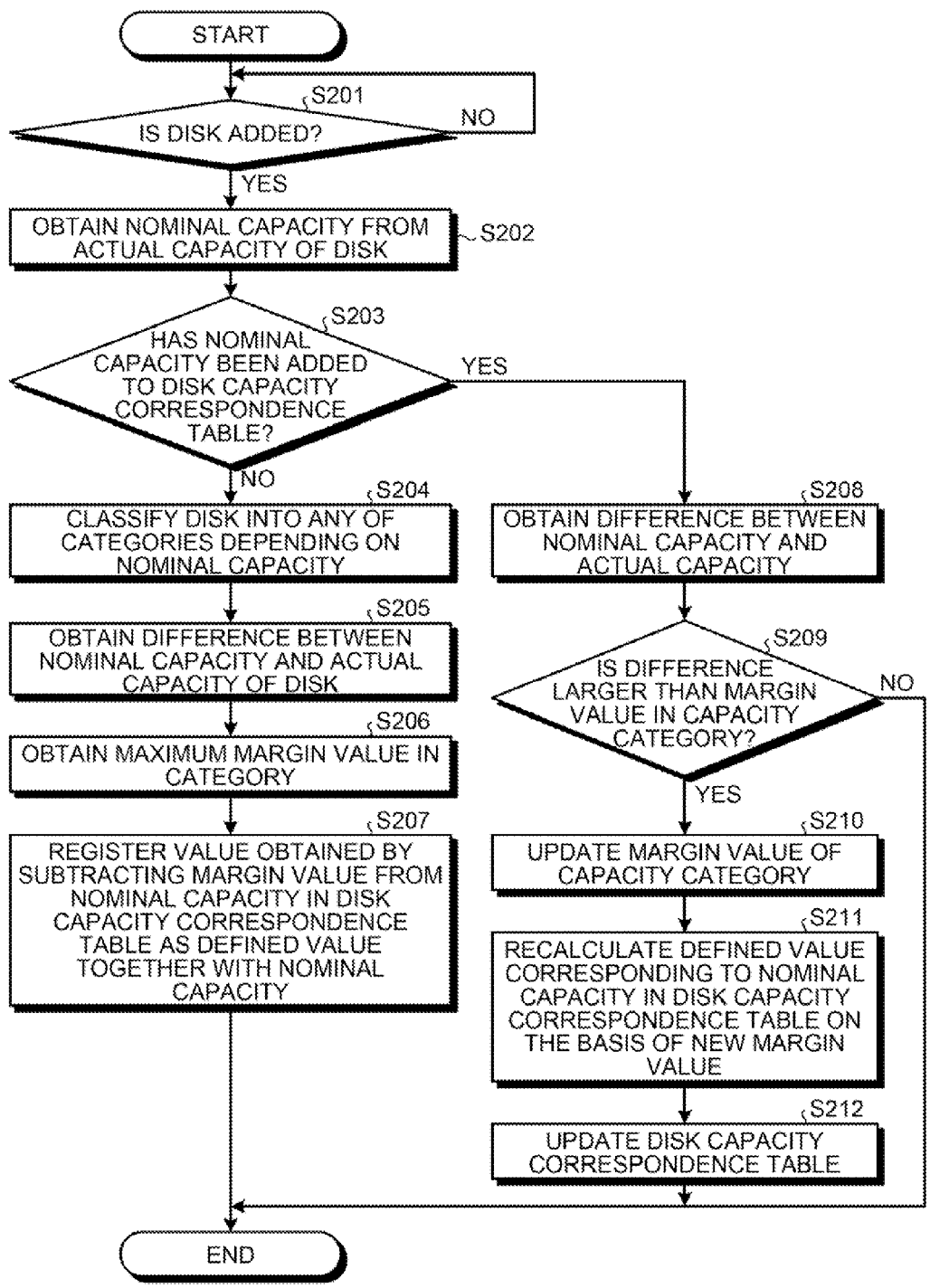
FIG. 14 is a flowchart illustrating procedures of a process of adding data to the disk capacity correspondence table performed by the CM according to the second embodiment.
Figure 15:
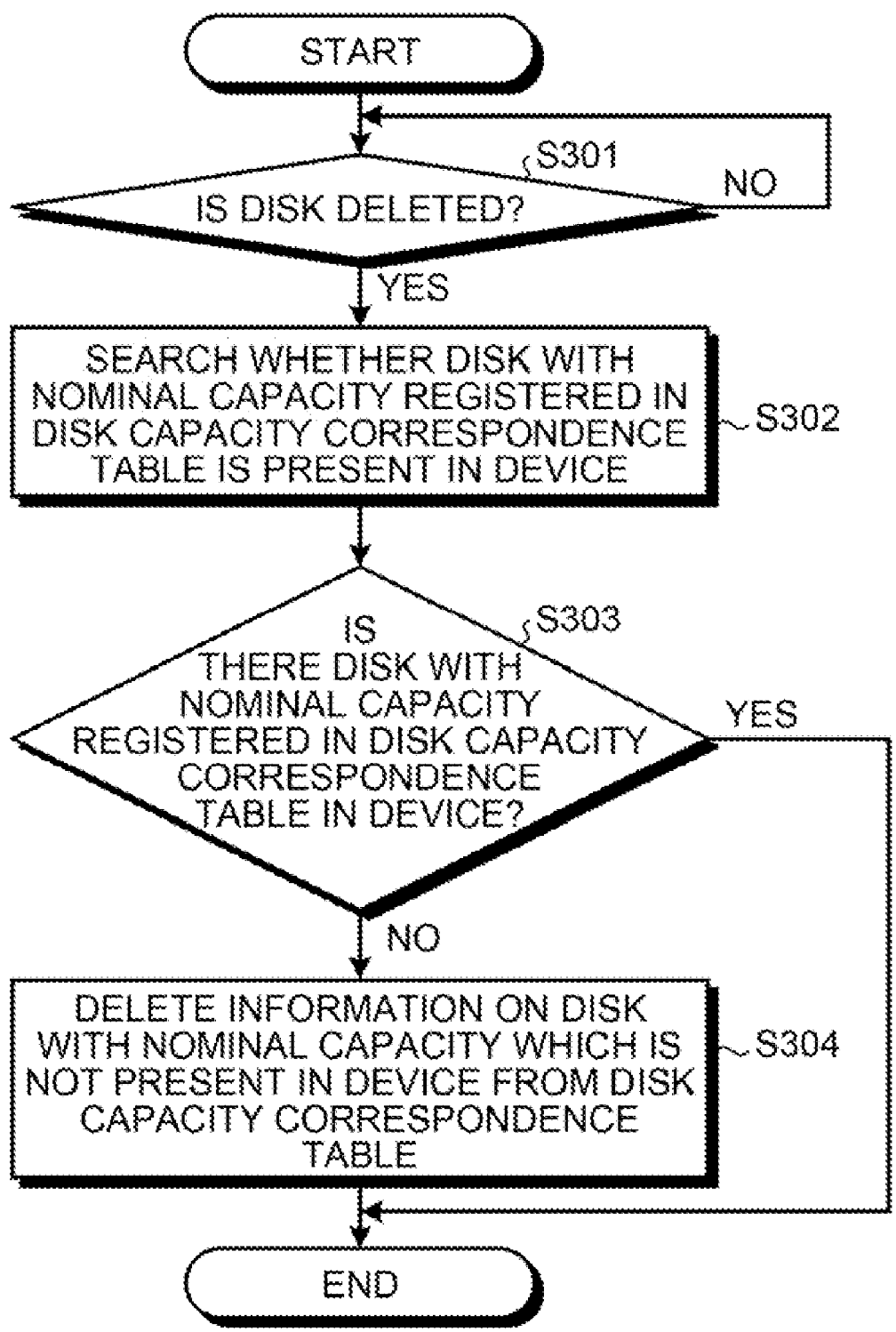
FIG. 15 is a flowchart illustrating procedures of a process of deleting data from the disk capacity correspondence table performed by the CM according to the second embodiment.
Figure 16:
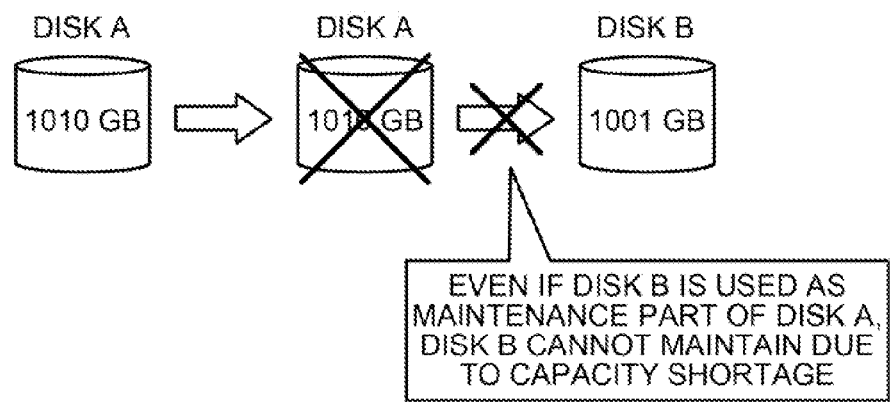
FIG. 16 is a diagram illustrating a case where a disk is selected according to an actual capacity of the disk.
Figure 18:
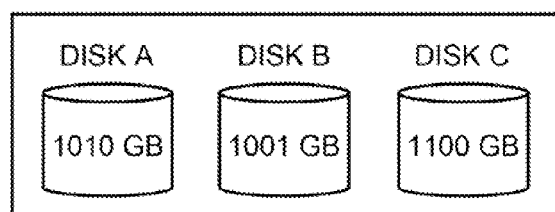
FIG. 18 is a diagram for explaining the disk capacity correspondence table.
Figure 20:
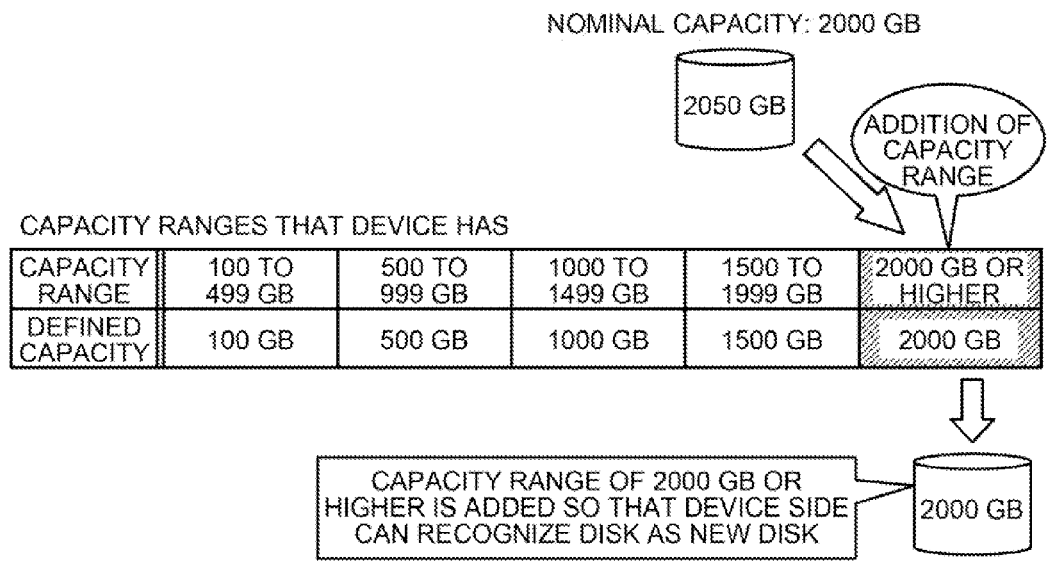
FIG. 20 is another diagram illustrating the case where a disk with a capacity in a new capacity range is added.
Figure 21:
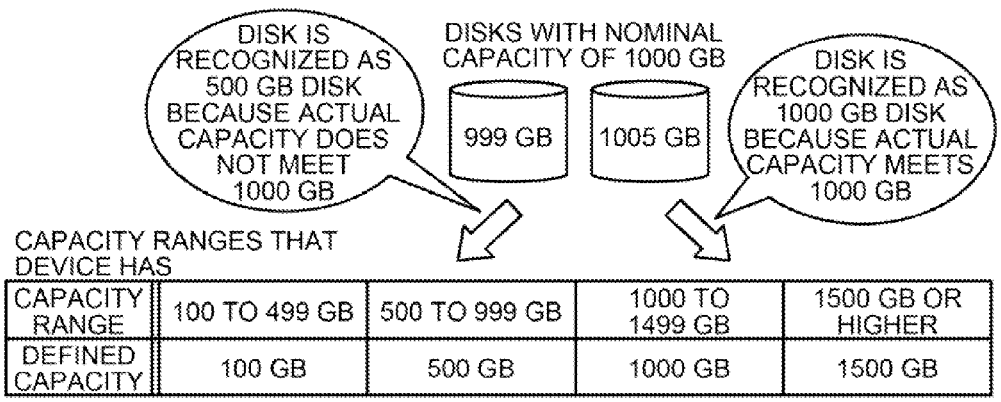
FIG. 21 is a diagram illustrating a case where disks with actual capacities in different capacity ranges from each other are added.

Subsequently, a process performed by the CM 10 according to the second embodiment is explained with reference to FIGS. 13 to 15. FIG. 13 is a flowchart illustrating procedures of a process of building the disk capacity correspondence table performed by the CM according to the second embodiment. FIG. 14 is a flowchart illustrating procedures of a process of adding data to the disk capacity correspondence table performed by the CM according to the second embodiment. FIG. 15 is a flowchart illustrating procedures of a process of deleting data from the disk capacity correspondence table performed by the CM according to the second embodiment.

As illustrated in FIG. 13, the CM 10 searches for the disks 20 mounted on the RAID device 100 (S101), and determines whether all the disks have been searched (S102). As a result, when it is determined that all the disks have not been searched (NO at S102), the CM 10 obtains a nominal capacity from an actual capacity of the disk (S103).

Then, the CM 10 classifies the disks into the categories by nominal capacity (S104), and obtains a difference between the nominal capacity and actual capacity of each of the disks 20 (S105). Then, the CM 10 obtains the maximum margin value in each category (S106), and registers a value obtained by subtracting the margin value from the nominal capacity in the disk capacity correspondence table 12c as a defined capacity together with the nominal capacity and a capacity range (S107), and then returns to S101. At S102, when all the disks have been searched (YES at S102), the process is terminated.

Subsequently, a process of adding data to the disk capacity correspondence table is explained with reference to FIG. 14. As illustrated in FIG. 14, if a disk 20 is newly added to the RAID device 100 (S201), the CM 10 obtains a nominal capacity from an actual capacity of the disk (S202). Then, the CM 10 determines whether the obtained nominal capacity has been added to the disk capacity correspondence table 12c (S203).

As a result, when it is determined that the nominal capacity has not yet been added to the disk capacity correspondence table 12c (NO at S203), the CM 10 classifies the disk 20 into any of the categories depending on the nominal capacity (S204), and obtains a difference between the nominal capacity and actual capacity of the disk 20 (S205). Then, the CM 10 obtains the maximum margin value in the category (S206), and registers a value obtained by subtracting the margin value from the nominal capacity in the disk capacity correspondence table 12c as a defined capacity together with the nominal capacity and a capacity range (S207).

At S203, when it is determined that the obtained nominal capacity has been added to the disk capacity correspondence table 12c (YES at S203), the CM 10 obtains a difference between the nominal capacity and an actual capacity (S208). Then, the CM 10 determines whether the obtained difference is larger than the margin value in the capacity category (S209). When the obtained difference is not larger than the margin value in the capacity category (NO at S209), the process is terminated.

On the other hand, when the obtained difference is larger than the margin value in the capacity category (YES at S209), the CM 10 updates the margin value of the capacity category (S210). Then, the CM 10 recalculates the defined capacity and capacity range corresponding to the nominal capacity in the disk capacity correspondence table 12c on the basis of the new margin value (S211). After that, the CM 10 updates the disk capacity correspondence table 12c (S212), and terminates the process.

Subsequently, a process of deleting data from the disk capacity correspondence table is explained with reference to FIG. 15. As illustrated in FIG. 15, when the disk 20 is deleted (YES at S301), the CM 10 searches whether the disk 20 with the nominal capacity registered in the disk capacity correspondence table 12c is present in the RAID device 100 (S302).

As a result of the search, when it is determined that there is no disk 20 with the nominal capacity within the disk capacity correspondence table 12c in the RAID device 100 (NO at S303), the CM 10 deletes information on the disk 20 with the nominal capacity, which is not present in the RAID device 100, from the disk capacity correspondence table 12c (S304). On the other hand, when it is determined that there is a disk 20 with the nominal capacity within the disk capacity correspondence table 12c in the RAID device 100 (YES at S303), the CM 10 terminates the process.

Effects of Second Embodiment

As described above, the CM 10 calculates a nominal capacity, which is a reference capacity, of each of the disks 20 storing therein data on the basis of an actual capacity of each of the disks 20, and calculates a difference value between the calculated nominal capacity and the actual capacity of each of the disks 20. Then, the CM 10 retrieves the maximum difference value out of the calculated respective difference values of the disks 20, and determines a defined capacity, which is an actually-used capacity, of each disk 20 depending on a value obtained by subtracting the maximum difference value from the nominal capacity. Therefore, even when a new capacity disk 20 is mounted, the CM 10 automatically defines a defined capacity of the new capacity disk 20, and thus it is possible to easily mount the new capacity disk without revising a device program. Furthermore, the storage management apparatus 1 according to the first embodiment determines a defined capacity on the basis of a value obtained by subtracting a margin value from a reference capacity, and therefore, even when an actual capacity is smaller than a nominal capacity, the storage management apparatus 1 can appropriately determine the defined capacity of the disk so as not to cross over the border of a capacity range.

Furthermore, according to the second embodiment, the CM 10 classifies the disks 20 into predetermined categories depending on the calculated nominal capacities of the disks 20, and retrieves the maximum difference value out of the respective difference values of the disks 20 in each of the categories. Therefore, the disks classified into the same category are about the same nominal capacity; as a result, a more appropriate maximum difference value can be used as a margin value, and a defined capacity of the disk can be appropriately determined.

Moreover, according to the second embodiment, the CM 10 stores the disk capacity correspondence table 12c in which a nominal capacity of disk and a capacity range indicating a range of actual capacity of disk are stored by each nominal capacity. Therefore, it is possible to facilitate the management of a disk 20 with a new capacity.

Furthermore, according to the second embodiment, when a disk 20 is newly added, the CM 10 calculates a difference value between a nominal capacity and an actual capacity of the disk 20. Then, the CM 10 compares the calculated difference value with the existing maximum difference value, and as a result of the comparison between the calculated difference value and the existing maximum difference value, if the calculated difference value is larger than the existing maximum difference value, the CM 10 sets the difference value as the maximum difference value. Therefore, even when a disk is newly added, a more appropriate maximum difference value can be obtained and used as a margin value; as a result, it is possible to determine a defined capacity of disk appropriately.

Moreover, according to the second embodiment, when a disk 20 is deleted, the CM 10 deletes information corresponding to the deleted disk from the disk capacity correspondence table 12c. Therefore, it is possible to delete information on a disk with a nominal capacity which is no longer present in the RAID device 100.

[c] Third Embodiment

The embodiments of the present invention are described above; furthermore, the present invention can be implemented in various different forms other than the embodiments described above. Another embodiment included in the present invention is described below as a third embodiment.

(1) System Configuration, etc.

The components of the device illustrated in the drawings are functionally conceptual ones, and do not always have to be physically configured as illustrated in the drawings. Specifically, specific forms of dispersion and integration of the components in the device are not limited to those illustrated in the drawings, and all or part of them can be configured to be functionally or physically dispersed or integrated in arbitrary units depending on respective loads or use conditions. For example, the nominal-capacity calculating unit 11a and the nominal-capacity classifying unit 11b can be integrated into one unit. Furthermore, all or any part of processing functions for the processes performed in the device are each realized by a CPU and a program analyzed and executed by the CPU, or can be realized as hardware by wired logic.

Out of the processes described in the present embodiments, all or part of the process described as the one performed automatically can be performed manually, or all or part of the process described as the one performed manually can be performed automatically by using the publicly-known method. In addition, the processing procedures, specific names, and information including various data and parameters illustrated in the above specification and the drawings can be arbitrarily changed unless otherwise specified.

(2) Program

The storage management method described in the present embodiments can be realized by causing a computer, such as a personal computer or a workstation, to execute a program prepared in advance. The program can be distributed over a network, such as the Internet. Furthermore, the program can be recorded on a computer-readable recording medium, such as a hard disk, a flexible disk (FD), a CD-ROM, an MO, or a DVD, so that the computer reads out the program from the recording medium and executes the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management apparatus comprising:
    a memory; and
    a processor coupled to the memory, wherein the processor executes a process comprising:
    calculating a reference capacity of each of storage devices storing therein data on a basis of an actual capacity of each of the storage devices;
    calculating a difference value between the calculated reference capacity and the actual capacity of each of the storage devices;
    retrieving the maximum difference value from the respective difference values in the storage devices; and
    determining a defined capacity, which is an actually-used capacity, of each of the storage devices on a basis of a value obtained by subtracting the maximum difference value from the calculated reference capacity.

2. The storage management apparatus according to claim 1, further comprising classifying the storage devices into categories depending on the calculated respective reference capacities, wherein
    the retrieving includes retrieving the maximum difference value from respective difference values in the storage devices in each classified category.

3. The storage management apparatus according to claim 1, further comprising a storage capacity correspondence table that stores the defined capacity and a capacity range indicating a range of actual capacity of storage device by each calculated reference capacity.

4. The storage management apparatus according to claim 1, wherein
    when a storage device is newly added, the calculating the difference value calculates a difference value between a reference capacity and an actual capacity of the storage device added,
    the retrieving includes comparing the calculated difference value with the existing maximum difference value, and
    if the calculated difference value is larger than the existing maximum difference value as a result of the comparison between the calculated difference value and the existing maximum difference value, the difference value is set as the maximum difference value.

5. A storage management method comprising:
    calculating a reference capacity of each of storage devices storing therein data on a basis of an actual capacity of each of the storage devices, using a processor;

calculating a difference value between the calculated reference capacity and the actual capacity of each of the storage devices, using the processor;

retrieving the maximum difference value from the respective difference values in the storage devices, using the processor; and determining a defined capacity, which is an actually-used capacity, of each of the storage devices on a basis of a value obtained by subtracting the maximum difference value from the calculated reference capacity, using the processor.

6. The storage management method according to claim 5, further comprising classifying the storage devices into categories depending on the calculated respective reference capacities, using the processor, wherein the retrieving includes retrieving the maximum difference value from respective difference values in the storage devices in each classified category, using the processor.

7. The storage management method according to claim 5, further comprising storing, in a storage capacity correspondence table, the defined capacity and a capacity range indicating a range of actual capacity of storage device by each calculated reference capacity, in a memory coupled to the processor.

8. The storage management method according to claim 5, wherein the calculating the difference value includes calculating a difference value between a reference capacity and an actual capacity of the storage device newly added, using the processor, the retrieving includes comparing the calculated difference value with the existing maximum difference value, and the difference value is set as the maximum difference value if the calculated difference value is larger than the existing maximum difference value as a result of the comparison, using the processor.

9. A non-transitory computer readable storage medium storing a program that causes a computer to execute a process comprising:

calculating a reference capacity of each of storage devices storing therein data on a basis of an actual capacity of each of the storage devices;

calculating a difference value between the calculated reference capacity and the actual capacity of each of the storage devices;

retrieving the maximum difference value from the respective difference values in the storage devices; and determining a defined capacity, which is an actually-used capacity, of each of the storage devices on a basis of a value obtained by subtracting the maximum difference value from the calculated reference capacity.

10. The non-transitory computer readable storage medium according to claim 9, wherein the process further comprises classifying the storage devices into categories depending on the calculated respective reference capacities, and the retrieving includes retrieving the maximum difference value from respective difference values in the storage devices in each classified category.

11. The non-transitory computer readable storage medium according to claim 9, wherein the process further comprises storing, in a storage capacity correspondence table, the defined capacity and a capacity range indicating a range of actual capacity of storage device by each calculated reference capacity.

12. The non-transitory computer readable storage medium according to claim 9, wherein the calculating the difference value includes calculating a difference value between a reference capacity and an actual capacity of the storage device newly added, and the retrieving includes comparing the calculated difference value with the existing maximum difference value, and the difference value is set as the maximum difference value if the calculated difference value is larger than the existing maximum difference value as a result of the comparison.

* * * * *